(12) United States Patent
Akutsu (10) Patent No.: US 11,398,792 B2
(45) Date of Patent: Jul. 26, 2022

(54) ELECTRIC POWER STEERING DEVICE

(71) Applicant: Mitsubishi Electric Corporation, Tokyo (JP)

(72) Inventor: Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/044,604

(22) PCT Filed: Sep. 26, 2018

(86) PCT No.: PCT/JP2018/035760
§ 371 (c)(1),
(2) Date: Oct. 1, 2020

(87) PCT Pub. No.: WO2019/234949
PCT Pub. Date: Dec. 12, 2019

(65) Prior Publication Data
US 2021/0104972 A1   Apr. 8, 2021

(30) Foreign Application Priority Data

Jun. 8, 2018 (JP) .............................. JP2018-110351

(51) Int. Cl.
*H02P 29/028* (2016.01)
*B62D 5/04* (2006.01)
(Continued)

(52) U.S. Cl.
CPC .......... *H02P 29/028* (2013.01); *B62D 5/0403* (2013.01); *B62D 5/0463* (2013.01);
(Continued)

(58) Field of Classification Search
CPC ........ H02P 29/028; H02P 25/22; H02P 27/06; H02P 21/22; H02P 21/50; B62D 5/0403; B62D 5/0463; B62D 5/0481
See application file for complete search history.

(56) References Cited

U.S. PATENT DOCUMENTS

| | | | |
|---|---|---|---|
| 8,421,388 B2 * | 4/2013 | Mukai | B62D 5/0487 318/400.21 |
| 2012/0049773 A1 * | 3/2012 | Muraho | H02P 27/06 318/400.3 |

(Continued)

FOREIGN PATENT DOCUMENTS

| | | |
|---|---|---|
| JP | 2011-78221 A | 4/2011 |
| JP | 2014-91456 A | 5/2014 |

OTHER PUBLICATIONS

Notice of Reasons for Refusal for corresponding JP 2018-110351, dated Dec. 19, 2018.

(Continued)

*Primary Examiner* — Muhammad S Islam
(74) *Attorney, Agent, or Firm* — Sughrue Mion, PLLC; Richard C. Turner (57) ABSTRACT

Provided is an electric power steering device including a motor-including a first and a second three-phase windings, first and second inverter circuits configured to supply electric power to the first and the second three-phase windings, respectively, a boost circuit configured to change a voltage of electric power to be supplied to each of the first and second inverter circuits, and a drive unit configured to cause, when an abnormality occurs in any one of a first system including the first three-phase winding and the first inverter circuit and a second system including the second three-phase winding and the second inverter circuit, to supply electric power at a higher voltage than a voltage before the occurrence of the abnormality to an inverter circuit included in a (Continued)

normal system by the boost circuit, the normal system being one of the first system and the second system, to thereby drive the inverter circuit.

5 Claims, 7 Drawing Sheets (51) Int. Cl.
*H02P 25/22* (2006.01)
*H02P 27/06* (2006.01)

(52) U.S. Cl.
CPC ............ *B62D 5/0481* (2013.01); *H02P 25/22* (2013.01); *H02P 27/06* (2013.01)

(56) References Cited

U.S. PATENT DOCUMENTS

| | | | | |
|---|---|---|---|---|
| 2012/0293004 | A1* | 11/2012 | Hashimoto | H02J 3/40 307/82 |
| 2017/0346436 | A1* | 11/2017 | Hara | B62D 5/0463 |
| 2018/0123496 | A1* | 5/2018 | Ilic | B60L 50/51 |
| 2018/0229762 | A1* | 8/2018 | Choi | B62D 5/046 |

OTHER PUBLICATIONS

International Search Report for PCT/JP2018/035760, dated Jan. 8, 2019.

* cited by examiner

ELECTRIC POWER STEERING DEVICE

CROSS REFERENCE TO RELATED APPLICATIONS

This application is a National Stage of International Application No. PCT/JP2018/035760 filed Sep. 26, 2018, claiming priority based on Japanese Patent Application No. 2018-110351 filed Jun. 8, 2018.

TECHNICAL FIELD

The present invention relates to an electric power steering device configured to generate an assist torque for assisting a steering torque of a vehicle.

BACKGROUND ART

Currently, electric power steering devices are mounted to many of vehicles such as automobiles. The electric power steering device is configured to generate an assist torque for assisting a steering torque when a driver operates a steering wheel of the vehicle to generate the steering torque. That is, the electric power steering device is configured to assist the operation on the steering wheel by the driver.

When the electric power steering device stops the assist, a required steering force increases. As a result, operability of the steering wheel decreases. This decrease in operability becomes more significant as the size of the vehicle increases. This is because a required assist torque increases as the size of the vehicle increases. In view of this fact, in recent years, a rotating electrical machine designed to have redundancy has been employed as a power source configured to generate the assist torque so as to reduce a fear in that the electric power steering device may stop the assist. As the rotating electrical machine designed to have the redundancy, there is a three-phase duplex motor including two sets of a three-phase winding and an inverter circuit, that is, two systems for driving.

In a case where such a three-phase duplex motor is employed, even when an abnormality, for example, a failure, occurs in one of the systems, the generation of the assist torque can be continued by another normal system. As a result, the fear in that the electric power steering device may completely stop the assist decreases.

However, when the abnormality occurs in the one system, an assist torque that has been generated by the abnormal system cannot be output. In view of this fact, among related-art electric power steering devices, there is an electric power steering device configured to, when an abnormality occurs in one system, increase a drive current supplied to another normal system, to thereby suppress the decrease in assist torque (for example, see Patent Literature 1).

CITATION LIST

Patent Literature

[PTL 1] JP 2011-78221 A

SUMMARY OF INVENTION

Technical Problem

When the drive current is increased, a heat generation amount of the three-phase winding increases, and the temperature of the three-phase winding is more liable to exceed an allowable temperature. As a result, there is a fear in that a period of time in which the assist can be continued may decrease. When the assist cannot be provided by the electric power steering device, maneuverability greatly decreases.

Moreover, when the drive current is increased, a magnetic field acting toward a direction of reducing magnetization of a magnet of a rotor increases. As the magnetization of the magnet is reduced, the maximum speed of the rotational speed decreases with respect to the torque to be generated. Therefore, when the speed of the steering of the steering wheel by the driver is high, it becomes difficult to supply the torque at the rotational speed appropriate for this steering, resulting in a decrease in maneuverability.

The present invention has been made in view of the above-mentioned problem, and has an object to provide an electric power steering device capable of suppressing a decrease in maneuverability of a vehicle even when an abnormality occurs in one system.

Solution to Problem

According to one embodiment of the present invention, there is provided an electric power steering device including: a motor, which includes a first three-phase winding and a second three-phase winding, and is to be used as a power source to generate an assist torque for assisting a steering torque of a vehicle; a first inverter circuit configured to supply electric power to the first three-phase winding; a second inverter circuit configured to supply electric power to the second three-phase winding; a boost circuit configured to change a voltage of the electric power to be supplied to each of the first inverter circuit and the second inverter circuit; and a drive unit configured to cause, when an abnormality occurs in any one of a first system including the first three-phase winding and the first inverter circuit and a second system including the second three-phase winding and the second inverter circuit, to supply electric power at a higher voltage than a voltage before the occurrence of the abnormality to an inverter circuit included in a normal system by the boost circuit, the normal system being one of the first system and the second system and being free of the abnormality, to thereby drive the inverter circuit.

Advantageous Effects of Invention

According to the present invention, the decrease in maneuverability of the vehicle can be further suppressed when an abnormality occurs in one system.

DESCRIPTION OF EMBODIMENTS

An electric power steering device according to each embodiment of the present invention is described below with reference to the drawings. In the drawings, components that are the same as or correspond to each other are denoted by the same reference symbols.

First Embodiment

Figure 1:
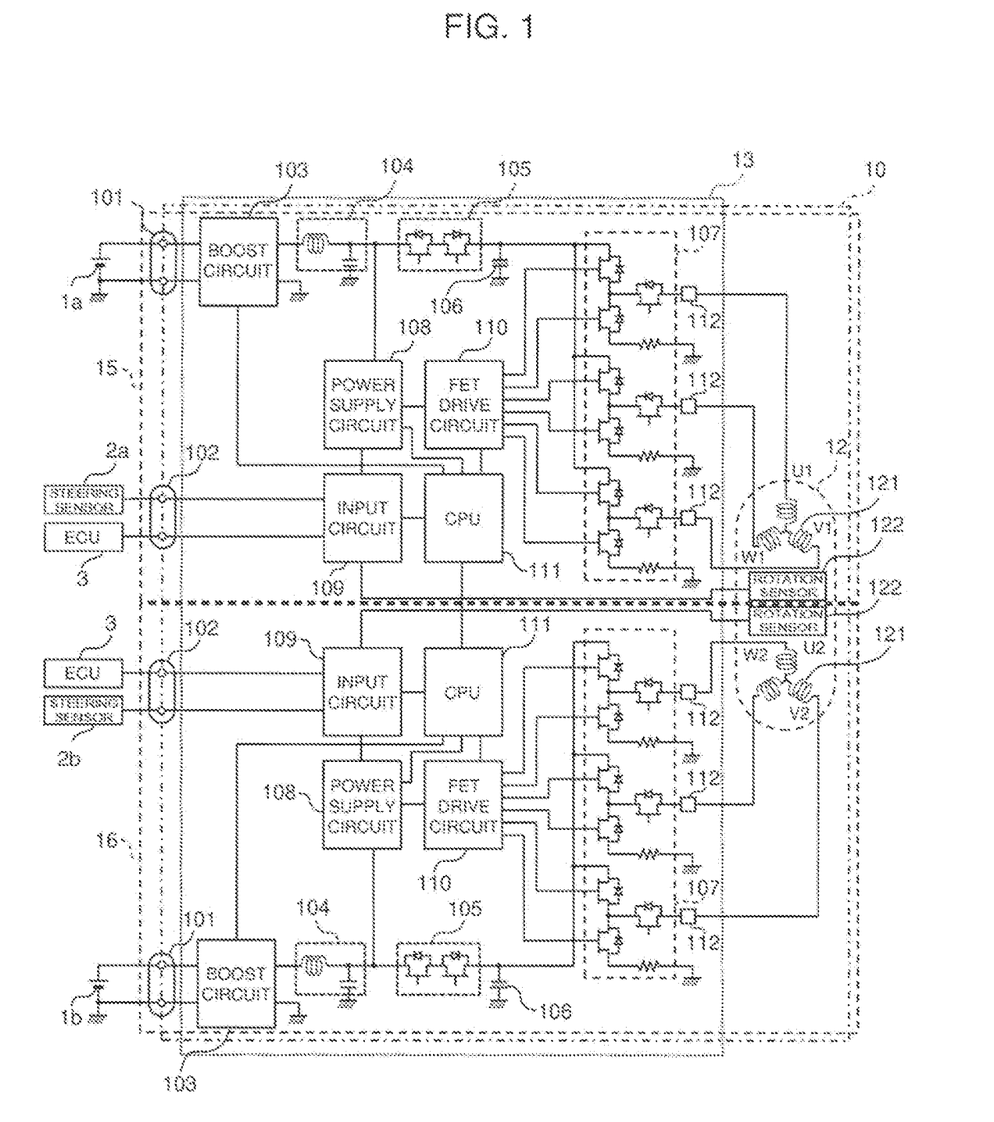
FIG. 1 is a block diagram for illustrating a circuit configuration example of an electric power steering device according to a first embodiment of the present invention.
Figure 2:
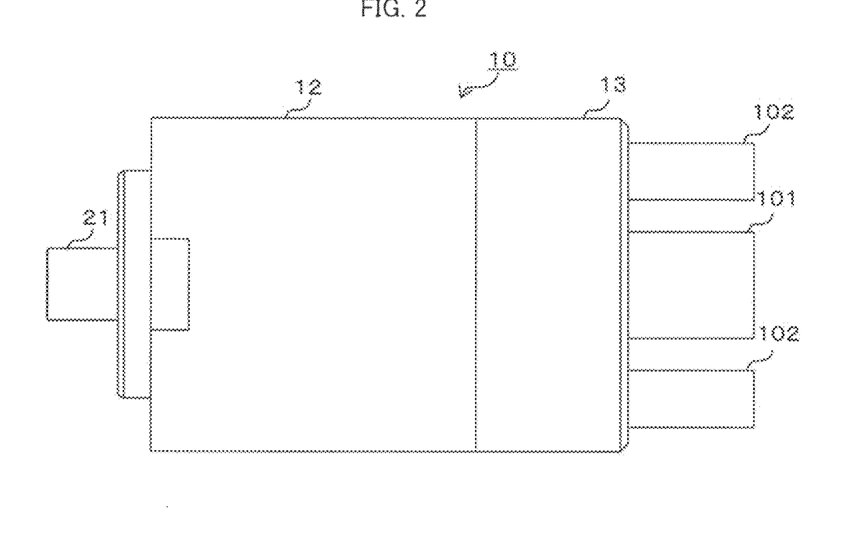
FIG. 2 is a side view for illustrating a rotating electrical machine employed in the electric power steering device according to the first embodiment of the present invention.
Figure 3:
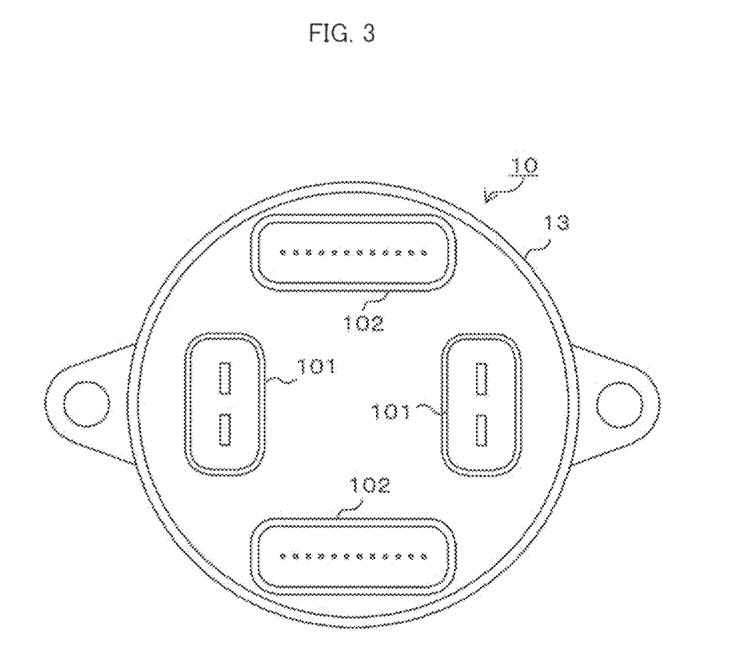
FIG. 3 is an end view for illustrating an anti-output shaft side of the rotating electrical machine employed in the electric power steering device according to the first embodiment of the present invention.
Figure 4:
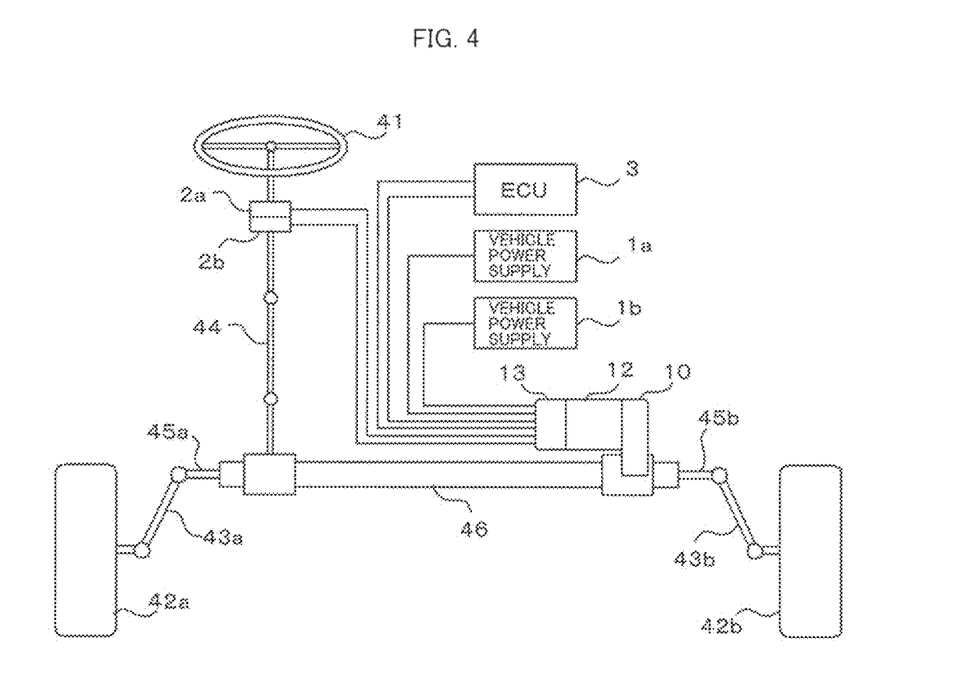
FIG. 4 is a block diagram for illustrating an overall configuration example of the electric power steering device according to the first embodiment of the present invention.

FIG. 1 is a block diagram for illustrating a circuit configuration example of an electric power steering device according to a first embodiment of the present invention. FIG. 2 is a side view for illustrating a rotating electrical machine employed in the electric power steering device according to the first embodiment of the present invention. FIG. 3 is an end view for illustrating an anti-output shaft side of the rotating electrical machine employed in the electric power steering device according to the first embodiment of the present invention. FIG. 4 is a block diagram for illustrating an overall configuration example of the electric power steering device according to the first embodiment of the present invention.

As illustrated in FIG. 4, the electric power steering device according to the first embodiment is mounted to a vehicle, for example, an automobile, and is configured to assist steering of a steering wheel 41 executed by the driver. When the driver operates the steering wheel 41 of the vehicle to generate a steering torque, the assist is executed by generating an assist torque for assisting the steering torque. This assist torque is generated through use of a three-phase duplex motor 10, which is a rotating electrical machine including two three-phase windings 121 illustrated in FIG. 1, as a power source.

As illustrated in FIG. 4, a steering shaft 44 is coupled to the steering wheel 41 to be operated by the driver. Two steering sensors 2a and 2b are mounted to the steering shaft 44. The steering sensors 2a and 2b are configured to detect a steering angle of the steering wheel 41 and the steering torque generated by the driver to operate the steering wheel 41.

For example, front wheels 42a and 42b are steered wheels, and are held by knuckle arms 43a and 43b, respectively. Tie rods 45a and 45b are coupled to the knuckle arms 43a and 43b, respectively. The tie rods 45a and 45b are coupled to a rack shaft 46. With this configuration, the operation on the steering wheel 41 is transmitted to the front wheels 42a and 42b through the steering shaft 44, the rack shaft 46, tie rods 45a and 45b, and the knuckle arms 43a and 43. Therefore, the front wheels 42a and 42b are steered in accordance with the operation on the steering wheel 41.

The three-phase duplex motor 10 is coupled, as a steering motor, to the rack shaft 46. As a result, power generated by the three-phase duplex motor 10 is transmitted to the rack shaft 46, and is used as the assist torque.

The three-phase duplex motor 10 is a rotating electrical machine including a motor unit 12 and a drive unit 13. The motor unit 12 is configured to rotate a rotor (not shown). The drive unit 13 is configured to drive the motor unit 12. The motor unit 12 is one motor, and is, for example, a permanent magnet synchronous motor. As illustrated in FIG. 4, the two steering sensors 2a and 2b, an engine control unit (ECU) 3, and two vehicle power supplies 1a and 1b are connected to the drive unit 13.

As illustrated in FIG. 2, in the three-phase duplex motor 10, a shaft 21 is protruded to the outside from the motor unit 12. The shaft 21 is a component forming the rotor of the motor unit 12. Power to the rack shaft 46 is transmitted through the shaft 21.

As illustrated in FIG. 2 and FIG. 3, on an end surface on the anti-output shaft side, which is an opposite side of a side on which the shaft 21 is protruded, two power supply connectors 101 and two signal connectors 102 are provided. The two power supply connectors 101 are connectors configured to individually connect to the two vehicle power supplies 1a and 1b. The two signal connectors 102 are connectors each configured to connect one of the two steering sensors 2a and 2b and the ECU 3. In the first embodiment, both of the power supply connectors 101 and the signal connectors 102 are duplexed.

As illustrated in FIG. 1, the motor unit 12 includes two three-phase windings 121 and two rotation sensors 122. In the drive unit 13, boost circuits 103, filter circuits 104, relay units 105, capacitors 106, inverter circuits 107, power supply circuits 108, input circuits 109, field effect transistor (FET) drive circuits 110, central processing units (CPUs) 111, and three current sensors 112 are configured so as to be duplexed. In FIG. 1, at least one nonvolatile memory configured to store programs to be executed by the CPUs 111 and the like, and at least one memory to be used as work areas are not shown. The CPUs 111 correspond to processing devices in the first embodiment.

As described above, in the three-phase duplex motor 10, the power supply connectors 101, the signal connectors 102, the motor units 12, and the drive units 13 are duplexed so as to build a first system 15 and a second system 16. The first system 15 and the second system 16 have the same configuration, and a more detailed description is given while focusing on the first system 15.

The boost circuit 103 is connected to the power supply connector 101, and electric power is supplied from the vehicle power supply 1a through the power supply connector 101. The boost circuit 103 is an electric power conversion circuit capable of executing boosting for increasing the voltage of the supplied electric power. In the first embodiment, the boost circuit 103 is configured not to operate at a normal time, and to directly output the electric power supplied from the vehicle power supply 1a. The boost circuit 103 may be a boost circuit capable of freely changing the level of the boosting. That is, the boost circuit 103 may be a boost circuit that is configured to operate at any time.

The filter circuit 104 is connected to an output side of the boost circuit 103. The filter circuit 104 is a circuit configured to remove a high-frequency component, and includes an inductor and a capacitor. An output side of the filter circuit 104 is connected to the relay unit 105 and the power supply circuit 108.

The relay unit 105 functions as a switch configured to control the electric power supply to the inverter circuit 107, and allows electrical connection and disconnection between the filter circuit 104 and the inverter circuit 107. In the first embodiment, the relay unit 105 has a configuration in which two power metal-oxide-semiconductor (MOS) FETs are connected in series. The gates of those two power MOS FETs are connected to the FET drive circuit 110.

The capacitor 106 is connected between an output side of the filter circuit 104 and a ground, and functions as a high-pass filter configured to remove a high-frequency component generated, for example, when the inverter circuit 107 operates.

The inverter circuit 107 is a circuit configured to supply electric power to the three-phase winding 121, and employs power MOS FETs as switching elements. The three power MOS FETs are used in each phase. The gate of each power MOS FET is connected to the FET drive circuit 110.

The current sensor 112 is configured to detect a current output in each phase by the inverter circuit 107. Therefore, the current sensor 112 is arranged between the inverter circuit 107 and the three-phase winding 121 in each phase.

The power supply circuit 108 is configured to convert the electric power supplied from the boost circuit 103 through the filter circuit 104, to thereby supply the electric power after the conversion to the input circuit 109, the FET drive circuit 110, and the CPU 111. The electric power of the vehicle power supply 1a is directly supplied from the boost circuit 103 to the CPU 111.

The input circuit 109 is a circuit configured to supply various types of information to the CPU 111. The steering sensor 2a and the ECU 3 are connected to the input circuit 109 through the signal connector 102. The rotation sensor 122 and each of the current sensors 112 are directly connected to the input circuit 109. With this configuration, the CPU 111 inputs, from the input circuit 109, detection results of the steering sensor 2a, specifically, the steering torque value and the steering angle, vehicle information output by the ECU 3, a rotation angle of the rotor detected by the rotation sensor 122, and the current values in the respective phases detected by the respective current sensors 112. The vehicle information output by the ECU 3 includes a vehicle speed.

The CPU 111 is configured to process the various types of information input from the input circuit 109 to identify timings to turn on and off each of the power MOS FETs forming the inverter circuit 107, to thereby control the FET drive circuit 110. As a result, each power MOS FET is driven to turn on and off, and the currents in the respective phases are supplied to the three-phase winding 121. The CPU 111 and the FET drive circuit 110 correspond to a drive unit in a narrow sense in the first embodiment.

The steering torque value and the vehicle speed are used to calculate, for example, current command values in two phases on rotating coordinates, that is, a current command value on a d axis and a current command value on a q axis. The current value in each phase detected by each current sensor 112 is used to calculate detection current values in the two phases on the rotation coordinates, that is, a detection current value on the d axis and a detection current value on the q axis. The rotation angle of the rotor detected by the rotation sensor 122 is used to calculate an angular frequency.

Voltage command values in the two phases on the rotating coordinates, that is, a voltage command value on the d axis and a voltage command value on the q axis, are calculated through use of the current command values in the two phases on the rotating coordinates and the detection current values in the two phases on the rotating coordinates. Voltage command values in three phases on stationary coordinates, that is, in respective U, V, and W phases, are generated through use of the voltage command values in the two phases on the rotating coordinates. The voltage command values in the three phases on the stationary coordinates and the angular frequency are used to generate other voltage command values in the three phases on the stationary coordinates. The on and off timings of each power MOS FET are determined through use of those voltage command values in the three phases. The CPU 111 is configured to execute, for example, the above-mentioned processing, and to use results of the processing to control the FET drive circuit 110.

The current values in the respective phases detected by the respective current sensors 112 and the rotation angle of the rotor detected by the rotation sensor 112 are used to detect an abnormality occurring in the first system 15. The CPU 111 is configured to monitor changes in those values, to thereby determine whether or not an abnormality has occurred. With this configuration, for example, when there is a phase in which the detected current value is greatly different from that in a normal state, or when the rotor does not normally rotate, it is determined that an abnormality has occurred.

When the CPU 111 determines that an abnormality has occurred, the CPU 111 notifies the CPU 111 of the second system 16 of the occurrence of the abnormality, to thereby stop the current supply to the three-phase winding 121 in the first system 15. With this configuration, in the first embodiment, when an abnormality, that is, a failure occurs in any one of the first system 15 and the second system 16, the system in which the abnormality has occurred is stopped, and only the normal system is operated, to thereby continue the supply of the assist torque. This applies to a case in which an abnormality occurs in the second system. In the following, a system in which an abnormality has occurred is referred to as "failed system", and a system that is normal is referred to as "normal system". When the current supply to the three-phase winding 121 is stopped in the first system 15, for example, each of the power MOS FETs forming the inverter circuit 107 is turned off, and the current supply to the inverter circuit 107 through the relay unit 105 is also shut off.

A detailed description is now given of control executed by the CPU 111 in the normal system when an abnormality has occurred in any one of the systems.

When an occurrence of an abnormality is notified by the CPU 111 in the abnormal system, the CPU 111 in the normal system changes a setting of the boost circuit 103 to cause the boost circuit 103 to execute the boosting. With this configuration, the CPU 111 causes the boost circuit 103 to supply electric power at a higher voltage than that in the normal state, that is, the state in which an abnormality is occurring in none of the first system 15 and the second system 16. The current value of this electric power is the same as that in the normal state. Therefore, the value of the torque generated by the motor unit 12 through the normal system does not change. The abnormal system is stopped, and the value of the torque generated by the entire motor unit 12 thus becomes ½ due to the occurrence of the abnormal system. The electric power is supplied to the power supply circuit 108 from the vehicle power supply 1a through the boost circuit 103, and control in accordance with the boosting of the voltage of the electric power is thus not executed in the power supply circuit 108.

However, there rarely occurs a state in which the maximum torque of the electric power steering device in the normal state is required for the steering of the vehicle. For example, about 50% of the maximum torque of that in the normal state is actually sufficient even in stationary steering during, for example, garaging. A torque required during the travel of the vehicle is even lower. In view of those facts, it can be actually considered that a region equal to or lower than ½ of the maximum torque in the normal state is an actual use region. Thus, even when the torque that can be generated becomes ½ of the maximum torque in the normal state due to an abnormality in one system, a sufficient torque for the actual use can be supplied.

However, while a problem does not occur in the torque even when the torque becomes ½, a speed, that is, an angular velocity of the steering wheel 41 steered by the driver is limited when the rotational speed of the motor unit 12 decreases. When the steering speed is limited, maneuverability of the vehicle decreases, and it is difficult for the drive to execute appropriate steering for danger avoidance or the like. In the first embodiment, this decrease in rotational speed is avoided by an increase in voltage of the electric power supplied to the inverter circuit 107. The boost circuit 103 is provided for the above-mentioned increase in voltage.

With reference to FIG. 5 to FIG. 8, a specific description is now given of characteristics of the motor unit 12. All of FIG. 5 to FIG. 8 are graphs for showing examples of results of simulation. In all of FIG. 5 to FIG. 8, the torque is assigned to the vertical axis, and the rotational speed is assigned to the horizontal axis.

Figure 5:
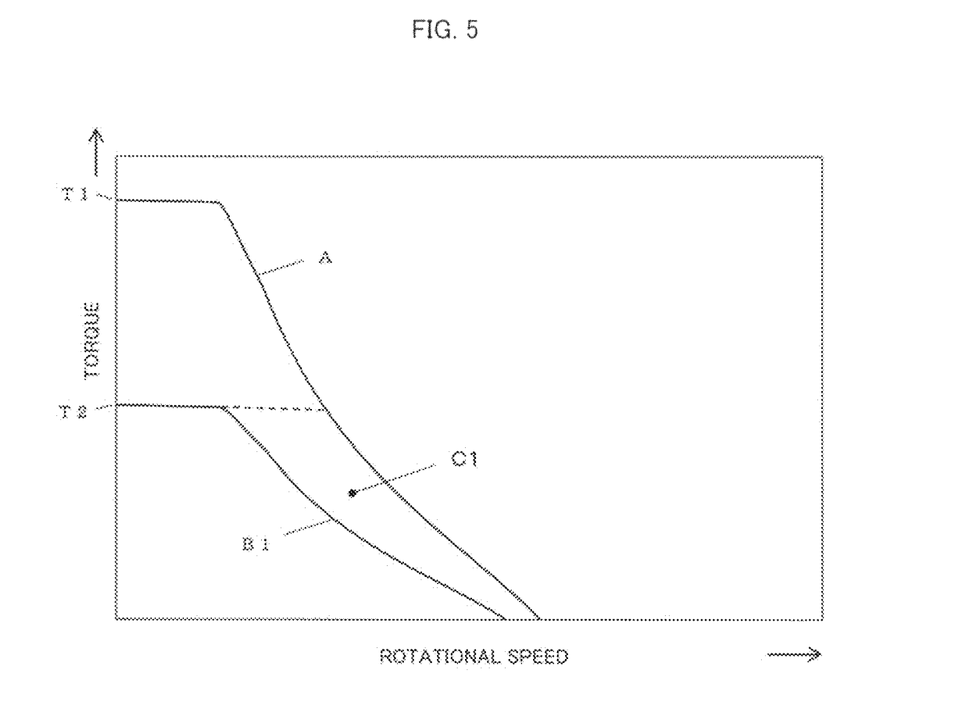
FIG. 5 is a graph for showing a characteristic example of each of numbers of systems exhibited when a motor unit is driven under a condition that a voltage applied to an inverter circuit is not changed.

FIG. 5 is a graph for showing a characteristic example of each of numbers of the systems exhibited when the motor unit is driven under a condition that the voltage applied to the inverter circuit is not changed. In FIG. 5, a curve A represents an example in which the motor unit 12 is driven by the two systems, that is, an example of the normal state, and T1 represents the maximum torque value in this case. A curve B1 represents an example in which the motor unit 12 is driven by only one system, and T2 represents the maximum torque value in this case. When the voltage is the same, as described above, a relationship of T1=2×T2 holds true.

When a region in which the torque is equal to or lower than ½ of the torque value T1 is considered as the actual use region, a region C1 surrounded by the dotted line representing the torque value T2, the curve A, and the curve B1 exists as shown in FIG. 5. In this region C1, when the motor unit 12 is driven by only one system, both of the torque and the rotational speed are insufficient. Therefore, in the region C1, the maneuverability greatly decreases compared with the normal state in which the motor unit 12 is driven by the two systems. The occurrence of the region C1 is caused by a state in which the one system stops, and the current amount supplied to the motor unit 12 becomes ½, resulting in the decrease in electric power.

Figure 6:
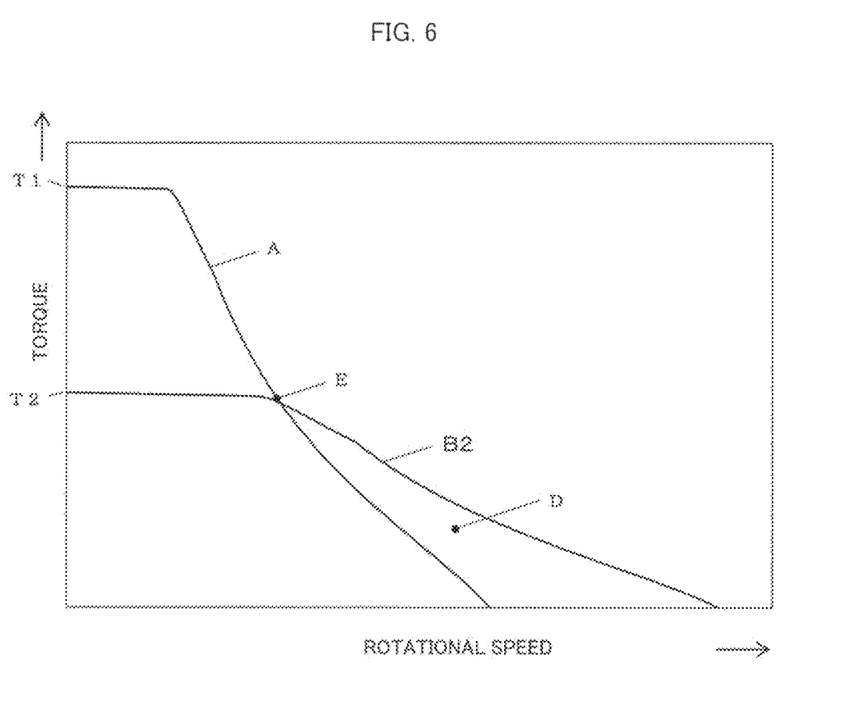
FIG. 6 is a graph for showing a characteristic example exhibited when the motor unit is driven by one system in which the voltage applied to the inverter circuit is increased when an abnormality occurs in one system.

FIG. 6 is a graph for showing a characteristic example exhibited when the motor unit is driven by one system in which the voltage applied to the inverter circuit is increased when an abnormality occurs in one system. In FIG. 6, a curve B2 represents the example exhibited when the motor unit 12 is driven by only one system in which the voltage to be applied to the inverter circuit 107 is simply increased. For the sake of comparison, the curve A is also shown. The current amount to be supplied is not changed, and the value of the maximum torque that can be generated is thus T2.

The motor unit 12, which is the permanent magnet synchronous motor, has such a characteristic that the rotational speed changes substantially linearly in accordance with the voltage. Therefore, due to the increase in voltage, even when the drive is executed by one system, there comes to exist a region D in which the rotational speed is higher than that of the drive by the two systems, that is, the region D surrounded by the curve A and the curve B2. However, in this region D, in contrast with the region C1, both of the torque and the rotational speed are excessive, resulting in a decrease in maneuverability.

The curve B2 shown in FIG. 6 is a curve in a case in which it is assumed that the rotational speeds are matched with each other at a point E, at which the maximum torque value T2 and the curve A intersect with each other. In this example, the voltage in the normal state, that is, the voltage at which the curve A is obtained, is 12 V. The voltage after the boosting, that is, the voltage for the drive only by one system, is 20 V.

The area of the region D can be reduced by further suppressing a boost level of the voltage. A region lower in rotational speed than the curve A, that is, a region surrounded by the dotted line representing the torque value T2, the curve A, and the curve B1 can be made greatly narrower than the region C1. Based on this fact, when the voltage is boosted in a case of an abnormality, the relationship between the supplied torque and the rotational speed can be made closer to that in the normal state compared with the related-art case, and the decrease in the maneuverability of the vehicle is thus suppressed.

Through further increasing the voltage after the boosting, the curve B2 can be shifted in a region in which the rotational speed is higher than that at the point E toward the side on which the torque is higher. With this configuration, the assist can be provided in the region in which the rotational speed is higher. However, it is not required to extend the rotational speed region in which the assist can be provided toward the high speed side compared with the rotational speed region in the normal state. This is because, compared with the normal state, this extension greatly changes steering feeling of the driver, and appropriate steering thus becomes difficult.

In addition to such a decrease in maneuverability, when the voltage increases, there occurs such a problem that withstand voltages required for switching elements such as the power MOS FETs increase. This problem causes an increase in cost of the switching elements. Moreover, when the maximum rotational speed is increased, there also occurs such a problem that strength of rotating portions including the rotor is required to be increased so as to withstand the increased rotation. Due to those problems, manufacturing costs of the three-phase duplex motor 10 and further, the power steering device increase, and weights thereof also increase. In terms of those problems and electric energy supplied to the motor unit 12, it is preferred that the voltage after the boosting be twice or lower than the voltage in the normal state.

In order to avoid the increase in rotational speed in the high rotation region as represented by the curve B2 of FIG. 6, in addition to the boosting of the voltage, a relationship between the maximum value of the d-axis current command value and the maximum value of the q-axis current command value is manipulated in the first embodiment. Specifically, in the abnormal state in which the drive is executed by only one system, the maximum value of the d-axis current command value is set to 34% of the maximum value of the q-axis current command value. In the normal state in which the drive is executed by the two systems, the maximum value of the d-axis current command value is 60% of the maximum value of the q-axis current command value.

The maximum torque value T2 is not changed, and the maximum value of the q-axis current command value in the abnormal state is thus the same as that in the normal state. Therefore, in the abnormal state, the maximum value of the d-axis current command value is approximately a half (=34/60) of that in the normal state.

The d-axis current command value is a control value that determines a magnitude of a magnetic flux to be generated. Therefore, the magnetic flux to be generated is reduced by further reducing the maximum value of the d-axis current command value, to thereby further suppress the rotational speed.

Figure 7:
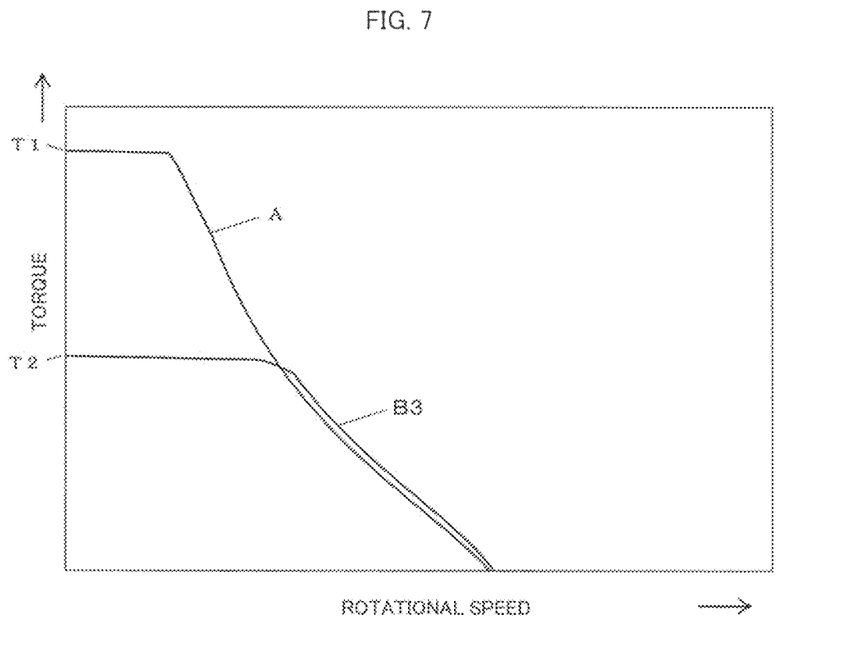
FIG. 7 is a graph for showing a characteristic example exhibited when a voltage applied to the inverter circuit is increased and the motor unit is driven by one system in which a relationship between the maximum value of a d-axis current command value and the maximum value of a q-axis current command value is manipulated.

FIG. 7 is a graph for showing a characteristic example exhibited when the voltage applied to the inverter circuit is increased and the motor unit is driven by one system in which the relationship between the maximum value of the d-axis current command value and the maximum value of the q-axis current command value is manipulated. In FIG. 7, a curve B3 represents the example in which the voltage applied to the inverter circuit 107 is increased, and the motor unit 12 is driven by the one system in which the relationship between the maximum value of the d-axis current command value and the maximum value of the q-axis current command value is manipulated, which corresponds to the first embodiment. For the sake of comparison, the curve A is also shown. The current amount to be supplied is not changed, and the maximum torque value to be generated is thus T2.

The relationship between the maximum value of the d-axis current command value and the maximum value of the q-axis current command value is appropriately manipulated so that the curve B3 matches well the curve A in the region in which the torque is equal to or lower than the maximum torque value T2 as shown in FIG. 7. Therefore, even when the motor unit 12 is driven by only one system, the decrease in maneuverability is avoided or a decrease is at a slight level if any. Thus, even when the drive is executed only one system, the driver can drive while having the same steering feeling or substantially the same feeling as that when the drive is executed by the two systems.

Figure 8:
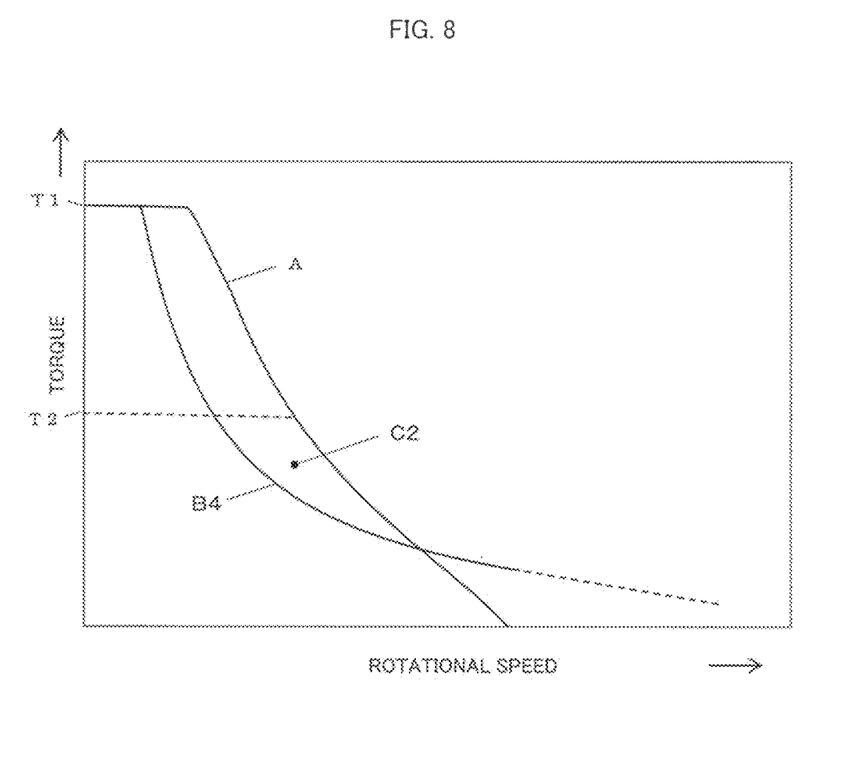
FIG. 8 is a graph for showing a characteristic example exhibited when the motor unit is driven by one system in which a current supplied to the inverter circuit is increased when an abnormality occurs in one system.

FIG. 8 is a graph for showing a characteristic example exhibited when the motor unit is driven by one system in which the current supplied to the inverter circuit is increased when an abnormality occurs in one system. In FIG. 8, a curve B4 represents an example exhibited when the motor unit 12 is driven by only one system in which the current supplied to the inverter circuit 107 is increased. For the sake of comparison, the curve A is also shown. T2 represents the maximum torque value obtained when the one system is used to drive in the case in which the current supplied to the inverter circuit 107 is not increased.

The maximum torque value T1 can be obtained by increasing the current supplied to the inverter circuit 107. However, as shown in FIG. 8, the region in which the required rotational speed is acquired becomes very narrow in the region in which the torque value is equal to or lower than the torque value T2. As a result, there is a region C2 surrounded by the broken line representing the torque value T2, the curve B4, and the curve A. Both the torque and the rotational speed are insufficient in the region C2, and the maneuverability thus decreases.

The example represented by the curve B4 of FIG. 8 is an example in which the current amount is twice as large as that in the normal state. A reason for a decrease in the rotational speed as a result of the increase in the current amount is, for example, that a loss increases in proportion to the square of the current amount, to thereby reduce effective electric power.

The increase in loss leads to an increase in temperature of the three-phase winding 121. Therefore, the increase in loss may cause a decrease in a drive continuation period in which the motor unit 12 can be driven. Also in this regard, consideration is required for the increase in current amount supplied to the inverter circuit 107.

In the first embodiment, the boost circuit 103 is provided in each of the first system 15 and the second system 16, but the boost circuit 103 may be connected to the first system 15 or the second system 16 in accordance with necessity. The three-phase duplex motor 10 includes the boost circuit 103 in each of the first system 15 and the second system 16, but the boost circuits 103 may not be included in the three-phase duplex motor 10. That is, for example, in place of the vehicle power supplies 1a and 1b, the boost circuits 103 may be connected to the three-phase duplex motor 10. The three-phase duplex motor 10 may include only the motor unit 12. That is, the drive unit 13 may be provided independently of the three-phase duplex motor 10.

In the electric power steering device configured in this manner, as described above, stable supply of a sufficient assist torque can be continued at the same rotational speed or at substantially the same rotational speed as that in the normal state even when an abnormality occurs in one system. Therefore, irrespective of whether or not an abnormality has occurred in one system, the maneuverability of the vehicle can always be maintained.

Second Embodiment

Figure 9:
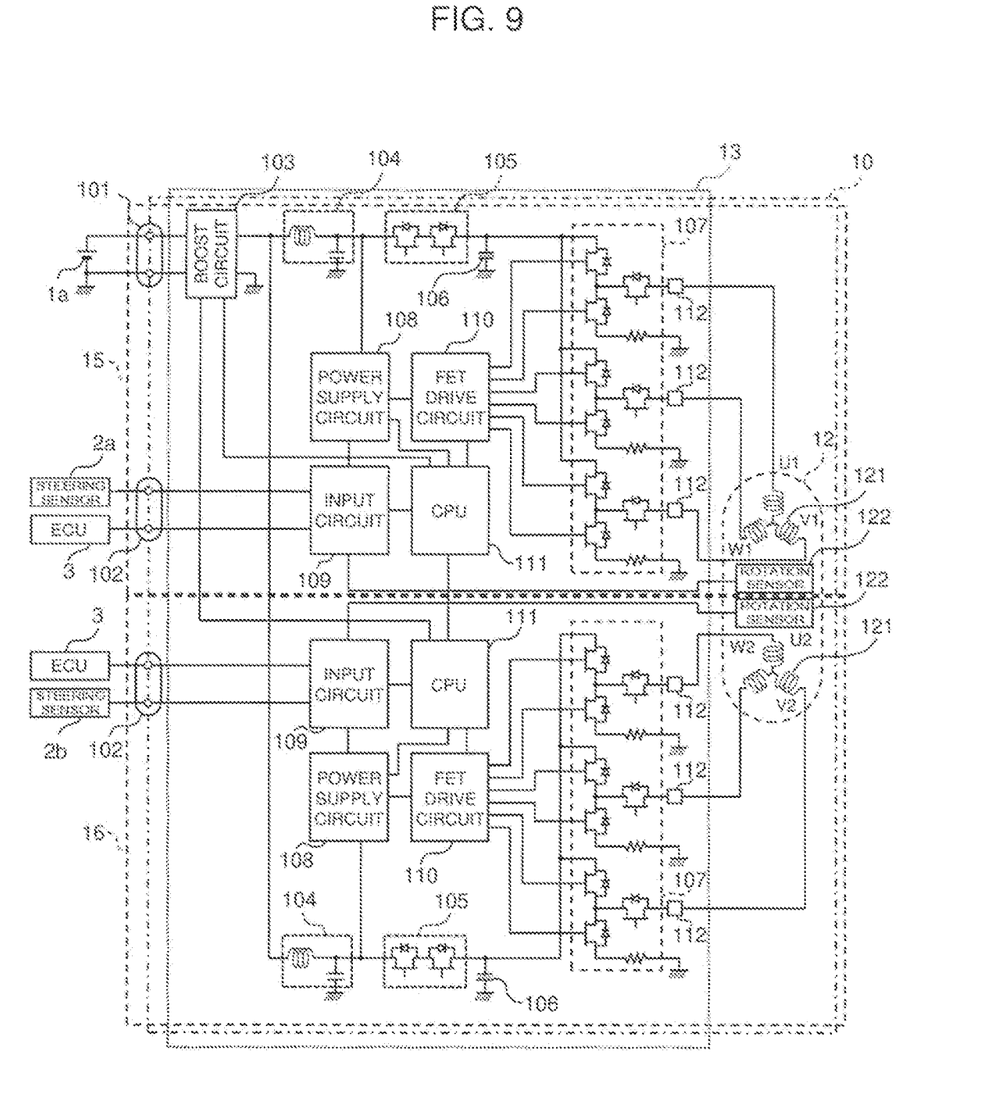
FIG. 9 is a block diagram for illustrating a circuit configuration example of an electric power steering device according to a second embodiment of the present invention.
Figure 10:
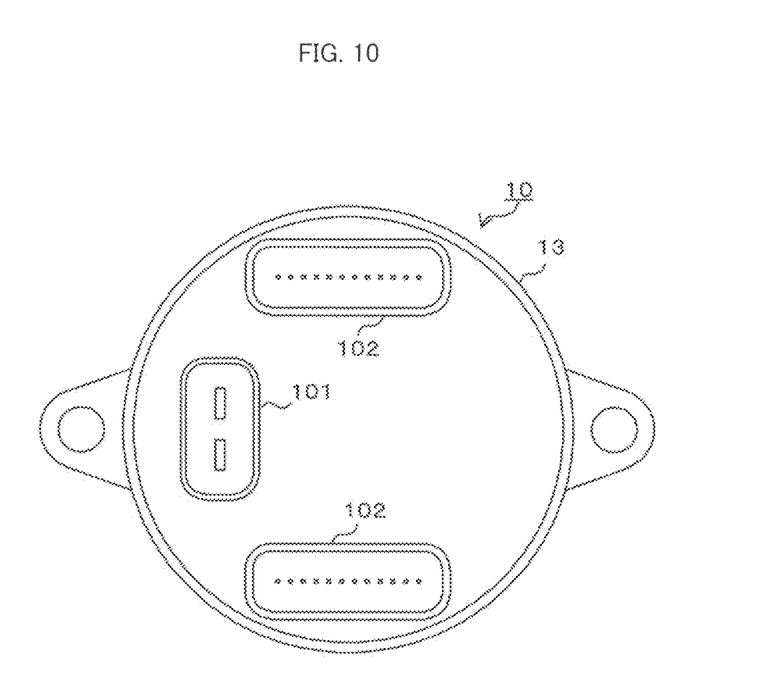
FIG. 10 is an end view for illustrating an anti-output shaft side of a rotating electrical machine employed in the electric power steering device according to the second embodiment of the present invention.
Figure 11:
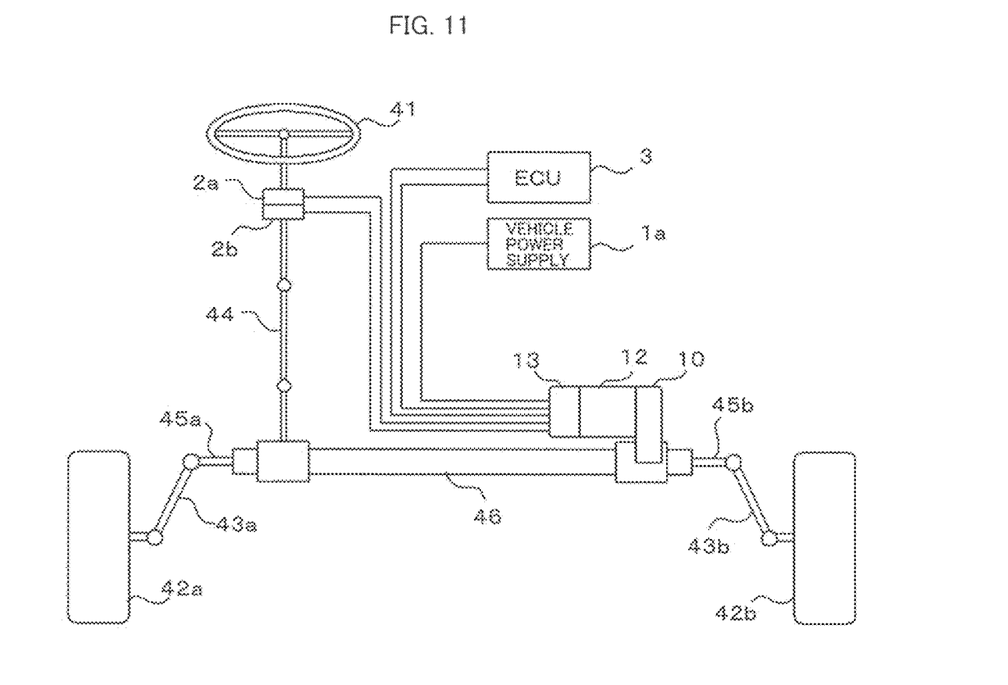
FIG. 11 is a block diagram for illustrating an overall configuration example of the electric power steering device according to the second embodiment of the present invention.

FIG. 9 is a block diagram for illustrating a circuit configuration example of an electric power steering device according to a second embodiment of the present invention. FIG. 10 is an end view for illustrating an anti-output shaft side a rotating electrical machine employed in the electric power steering device according to the second embodiment of the present invention. FIG. 11 is a block diagram for illustrating an overall configuration example of the electric power steering device according to the second embodiment of the present invention. A side view for illustrating the rotating electrical machine employed in the electric power steering device according to the second embodiment of the present invention is the same as FIG. 2.

In the first embodiment, as illustrated in FIG. 1, the boost circuit 103 is included in each of the first system 15 and the second system 16. However, the boost circuit 103, which is operated only when an abnormality occurs in one system, has a lower failure probability compared with the CPU 111, the control circuits, for example, the FET drive circuit 110, the inverter circuit 107, and the like. In consideration of this fact, in the second embodiment, as illustrated in FIG. 9, only one boost circuit 103 is provided for the three-phase duplex motor 10, and the boost circuit 103 is common to the first system 15 and the second system 16. With this configuration, in the three-phase duplex motor 10, only one power supply connector 101 is provided as illustrated in FIG. 9 and FIG. 10, and only the vehicle power supply 1a is connected as illustrated in FIG. 9 and FIG. 11.

The failure probability of the boost circuit 103 is lower than those of other components, and only one boost circuit 103 can thus maintain sufficient reliability. That is, as in the first embodiment, the maneuverability of the vehicle can always be maintained. The production costs and the weights of the three-phase duplex motor 10 and further, the electric power steering device can be suppressed more than in the first embodiment through the reduction of the number of the boost circuits 103.

In the first and second embodiments, the power supply circuit 108, the input circuit 109, the FET drive circuit 110, and the CPU 111 are included in each of the first system 15 and the second system 16. However, one or more of those components may be shared between the first system 15 and the second system 16. That is, the two inverter circuits 107 in the first system 15 and the second system 16 may be driven by one drive unit. The configuration of the electric power steering device is not limited to the configuration illustrated in FIG. 4 or FIG. 11.

REFERENCE SIGNS LIST

1a, 1b vehicle power supply, 2a, 2b steering sensor, 3 ECU, 41 steering wheel, 10 three-phase duplex motor (rotating electrical machine), 12 motor unit, 13 drive unit, 15 first system, 16 second system, 101 power supply connector, 102 signal connector, 103 boost circuit, 107 inverter circuit, 109 input circuit, 110 FET drive circuit, 111 CPU, 112 current sensor, 121 three-phase winding, 122 rotation sensor.

The invention claimed is:

1. An electric power steering device, comprising:
a motor, which includes a first three-phase winding and a second three-phase winding, and is to be used as a power source to generate an assist torque for assisting a steering torque of a vehicle;
a first inverter circuit configured to supply electric power to the first three-phase winding;
a second inverter circuit configured to supply electric power to the second three-phase winding;
a boost circuit configured to change a voltage of the electric power to be supplied to each of the first inverter circuit and the second inverter circuit; and
a drive unit configured to cause, when an abnormality occurs in any one of a first system including the first three-phase winding and the first inverter circuit and a second system including the second three-phase winding and the second inverter circuit, to stop the drive of the inverter circuit included in the system in which the abnormality has occurred between the first system and the second system, and to supply electric power at a higher voltage than a voltage before the occurrence of the abnormality to an inverter circuit included in a normal system by the boost circuit, the normal system being one of the first system and the second system and being free of the abnormality, to thereby drive the inverter circuit included in the normal system.

2. The electric power steering device according to claim 1, wherein the boost circuit is provided for each of the first system and the second system.

3. The electric power steering device according to claim 1, wherein the boost circuit is configured to supply electric power at a voltage that is higher than the same voltage as the voltage before the occurrence of the abnormality and is equal to or lower than twice the voltage.

4. The electric power steering device according to claim 1, wherein, when the abnormality occurs, the drive unit reduces a maximum value of a d-axis current command value, which is used to drive the inverter circuit included in the normal system, to a value smaller than a maximum value before the occurrence of the abnormality.

5. The electric power steering device according to claim 1, wherein, as the drive unit, a first drive unit for the first system and a second drive unit for the second system are provided,
wherein the first drive unit and the second drive unit include a processing device, respectively, to drive the first inverter circuit and the second inverter circuit, respectively, and
wherein the processing device included in each of the first drive unit and the second drive unit to cause, when an abnormality occurs in own system, stop the drive of an inverter circuit included in the own system and notify the processing device of another system of the occurrence of the abnormality, and when being notified of the occurrence of the abnormality, to supply the electric power at a voltage higher than a voltage before notification of the occurrence of the abnormality to the inverter circuit included in the own system by the boost circuit, to thereby drive the inverter circuit included in the own system.

* * * * *